United States Patent [19]

Beckmann et al.

[11] 3,944,815
[45] Mar. 16, 1976

[54] FIRING APPARATUS FOR A PLURALITY OF ELECTRIC VALVES

[75] Inventors: Oskar Beckmann, St. Polten; Adolf Habock, Uttenreuth; Karl-Friedrich Leowald, Weiher, all of Germany

[73] Assignee: Siemens Aktiengesellschaft, Munich, Germany

[22] Filed: Nov. 29, 1974

[21] Appl. No.: 528,491

[30] Foreign Application Priority Data
Dec. 5, 1973  Germany............................ 2360645

[52] U.S. Cl. .................. 250/209; 250/216; 250/578; 307/252 L; 315/152; 315/155
[51] Int. Cl.² .......................................... H03K 17/78
[58] Field of Search ........... 250/208, 209, 239, 216, 250/551, 578; 307/311, 252 L; 315/149, 152, 155, 185 R, 192, 193

[56] References Cited
UNITED STATES PATENTS

| | | | |
|---|---|---|---|
| 3,386,027 | 5/1968 | Kilgore et al. .................. | 250/209 X |
| 3,646,427 | 2/1972 | Koval et al..................... | 250/239 X |
| 3,671,749 | 6/1972 | Harnden .......................... | 250/208 X |
| 3,723,768 | 3/1973 | Eccles et al..................... | 307/311 X |

*Primary Examiner*—Archie R. Borchelt
*Assistant Examiner*—E. R. LaRoche
*Attorney, Agent, or Firm*—Kenyon & Kenyon Reilly Carr & Chapin

[57] ABSTRACT

The invention concerns a firing device for a number of electric valves, particularly thyristors. Each thyristor control path is associated with a firing circuit with a detector for electromagnetic radiation responsive to a transmitter which is controlled by a firing control signal and is equipped with a radiating device which energizes the individual detectors. The detectors are arranged close together in a plane perpendicular to the radiation direction of the radiator. In order to obtain latitude in the arrangement of the detectors, the radiator is designed so that it furnishes a parallel-ray bundle of radiation and the detectors are spatially arranged relative to each other, such that they are exposed to the parallel ray bundle without mutual shadowing upon projection in the direction of the radiation on a projection plane which is perpendicular to the radiation direction.

19 Claims, 4 Drawing Figures

FIRING APPARATUS FOR A PLURALITY OF ELECTRIC VALVES

BACKGROUND OF THE INVENTION

1. Field of the Invention

The invention concerns a firing device for a plurality of electric valves, especially thyristors, with each of whose control paths a firing circuit with a detector for electromagnetic radiation is associated with a transmitter which is controlled by a firing control signal and is equipped with a radiator which energizes the individual detectors. The detectors are arranged close together in a plane perpendicular to the direction of radiation of the radiator.

2. Description of the Prior Art

A firing circuit which derives firing energy from the voltage at the anode-cathode path of the respective valve is well known (German Pat. No. 1,538,099) to use for firing an electric valve, particularly a thyristor. In this connection, a pulse capacitor is used which is charged by this voltage and is discharged, when needed, by means of a switching element onto the control path of the valve. As the switching member, in particular, a light-controlled thyristor is used which can be triggered through light irradiation from a light source placed at some distance. In this manner, electric potential differences which exist between the light source, as the transmitter of electromagnetic radiation, and the electric valve, have no influence on the firing. Such a firing circuit is therefore used preferably for the firing of electric valves for high voltage, particularly of high-voltage thyristors which are employed in a rectifier arrangement.

Another possibility of transmitting a firing control signal by radiation from a transmitter to a firing circuit which is equipped with a detector for this electromagnetic circuit, is described in Swiss Pat. No. 413,993. High frequency radiation is used here as the electromagnetic radiation. The firing of one or several valves by means of a high-frequency transmission path is largely free of interference and is particularly well suited for the firing of thyristors which are used in rectifiers for high-voltage d-c transmission systems.

It is known (German Offenlegungsschrift No. 1,513,868) to arrange the individual detectors in a circle around the transmitter as the center. It is also known (German Offenlegungsschrift No. 2,026,901) that a spherical configuration can be used as well. So that all detectors are subjected to the same radiation intensity, they must be arranged at the same distance from the radiator. This requirement is a considerable limitation of the possibilities to place the detectors.

It is an object of the present invention to arrange, in the firing device described above, the detectors in a space-saving manner and with freedom of placement, as far as their distance from the radiator is concerned, where every detector is to be irradiated with approximately the same radiation intensity, so that overall, the power and the radiating surface area of the transmitter can be kept small.

SUMMARY OF THE INVENTION

According to the invention, this problem is solved by the provision that the radiator is designed so that it furnishes a parallel ray beam, and that the detectors are spatially displaced relative to each other, in such a manner that they are exposed to the parallel-ray beam without mutual shadowing if the projection is made on a projection plane perpendicular to the direction of radiation.

A transmitter is provided to radiate a parallel-ray beam, wherein its radiating surface area is about as large as the area taken up by the individual detectors. The firing device is designed so that an observer who views the detectors in the direction of the radiation from the transmitter, sees an area-wise dense arrangement within an area. The distribution of mutual displacement of the individual detectors within this area must be made so that each detector is exposed to the electromagnetic radiation of the transmitter. Care must therefore be taken that no detector, its firing circuit following it electrically, and/or the valve in question does not shadow other detectors. On the other hand, however, a mutual safety distance, which in each case is determined by the electric potential conditions of the valves, must be maintained between the detectors.

A preferred further embodiment of the invention is distinguished by the feature that a given number of detectors is subdivided into individual groups; that the detectors of each group together are arranged distributed in a separate group plane; and that the group planes are aligned parallel to each other. The number of detectors in each group may be the same in this staggered arrangement.

Additionally the detectors, at least within one group plane, are arranged in a symmetrical configuration. The symmetrical configuration can be chosen, for instance, as a rectangle, a circle or an ellipse.

A simple arrangement is obtained if the detectors in each group plane are arranged in a symmetrical respective configuration, and if the axes of symmetry of all configurations coincide with each other and with the direction of radiation from the transmitter. Provision may be made to displace the symmetrical configurations rotationally with respect to each other. It is also advantageous that the symmetrical configurations are of different sizes. Then they can be aligned with their edges parallel to each other. Rectangles, circles or ellipses may again be chosen as the configurations.

A particularly advantageous further embodiment of the firing device is distinguished by the feature that the size of the symmetrical configurations decreases in the direction of radiation from the transmitter. Through this means one obtains a structure, composed of the individual symmetrical configurations, which is tapered in the direction of the radiation from the transmitter. If the detectors are distributed on a circle in the individual group planes, one thus obtains a circular, truncated cone, and with an elliptical distribution, an elliptical, truncated cone is obtained. This further embodiment is particularly advantageous for the reason that the firing circuit following each detector can be directed radially outward from the main radiation axis, so that shadowing of the detectors farther removed from the transmitter is avoided.

If the generatrix of the body formed by the individual configurations is made a straight line, the individual group planes can always have the same distance from each other. In general, care will be taken that the mutual distances of the detector do not fall below a given minimum distance. Here, it is advisable to make the generatrix of the body formed by the configurations parabolic.

Instead of combining detectors in groups, one can also proceed by arranging the detectors along a helical line, the radius of which decreases upon progression in the direction of radiation from the transmitter. This firing device again has the advantage that shadowing of detectors by the firing circuits and valves of other detectors can be avoided. An observer viewing the detectors in the direction of radiation from the transmitter sees again an area-wise dense arrangement in the projection plane.

It should further be mentioned that the detectors can be of elongated design. It then contributes to a space-saving design if the longitudinal axes of these detectors are aligned radially to a main beam direction, which coincides with the main direction of radiation from the transmitter.

It should finally be pointed out further that, in order to achieve a high area-wise density of the detectors, the respective receivers can be disposed in the heat sink of the electric valve, if electric valves are used which are each equipped with a heat sink.

The electromagnetic radiation emitted by the transmitter may be light in the visible range of the spectrum, infrared light or high-frequency radiation, e.g., in the GHz range.

DESCRIPTION OF THE INVENTION

Figure 1:
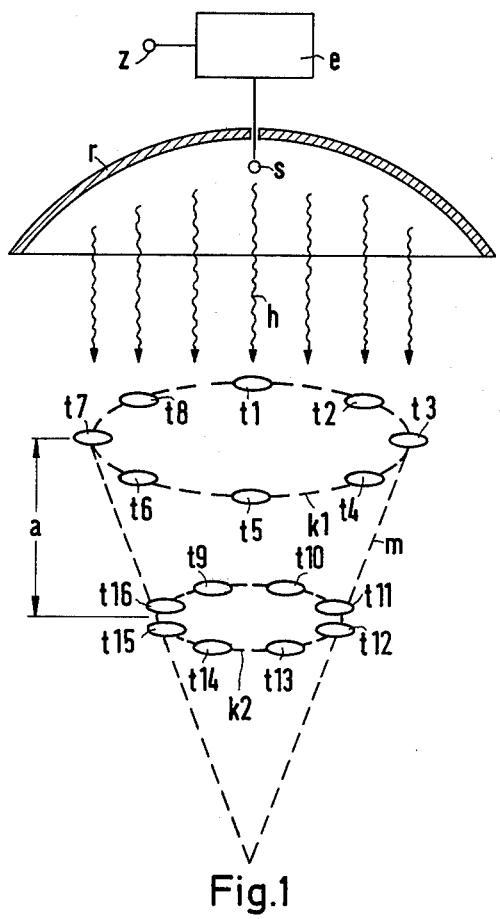
FIG. 1 shows a firing arrangement for a number of electric valves, in which the reflector of the transmitter is shown in cross section and the circular arrangement of the detectors in two group planes is shown in perspective.

In FIG. 1, a firing device for a number of electric valves is depicted. This is to involve a total of 16 controlled valves (not shown). These valves may, in particular, be thyristors. It is assumed that these valves are connected in series with each other. This series connection may be part of a rectifier for high-voltage d-c transmission. Each valve is laid out for a voltage of, say, 1 kV. So that the dissipation loss developed in operation can be removed, the individual valves can be provided with heat sinks (not shown) including cooling fins, which take up a certain amount of space. For firing the valves, a firing control signal $z$ is provided, which is formed, for instance, in a control circuit (not shown) for keeping the voltage or frequency of the rectifier constant. This firing control signal $z$ is fed to a transmitter $e$, which is equipped with a radiating head or feed $s$. The transmitter $e$ may involve, for instance, a voltage source that can be switched on and off by the firing control signal $z$, and the radiator $s$, and incandescent lamp or a light-emitting diode. However, a high-frequency transmitter may also be provided as the transmitter $e$, which radiates high-frequency radiation by way of a high-frequency antenna used as the radiator $s$. An antenna with a parabolic mirror or a dipole antenna, for instance, may be provided as the h-f antenna. The frequency of the high-frequency radiators may be, for instance, 2.4 GHz. As the high-frequency for the transmission of the firing control signal by radio, one above 300 MHz can be chosen. The radiator $s$ is designed in the present case as a point source.

The electromagnetic radiation emitted may thus be in the visible range of the spectrum or in the high-frequency spectral range, but also in the infrared or UV range of the spectrum.

As can be seen from FIG. 1, the radiator $s$ is arranged inside a reflector $r$. This reflector $s$ is shown in cross section. Its inside surface may be metallic. The reflector $r$ is designed as a parabolic mirror in such a manner that it furnishes an electromagnetic parallel-ray beam. The direction of radiation from the transmitter $e$ is indicated by wavy arrows. The central axis or main beam axis is designed with the letter $h$. The reflector $r$ may be arranged at the ceiling of a building or the ceiling of a housing which encloses the electric valves to be controlled. The electromagnetic radiation used for the wireless firing of the valves is then directed downward. However, the reflector $r$ may instead also be arranged at the bottom of the housing, so that it radiated vertically upward. Lateral irradiation is also possible.

The control path of each of the 16 electric valves mentioned is associated with a detector for electromagnetic radiation. These 16 detectors are shown in FIG. 1 as the detectors $t1$ to $t16$. They are arranged at some distance from the reflector $r$. If light is used for the transmission, these detectors $t1$ to $t16$ may be photodiodes or phototransistors. If, on the other hand, high-frequency radiation is used for the transmission, the detectors $t1$ to $t16$ are high-frequency antennas followed by receivers.

Viewed in the direction of radiation from the reflector $r$, the detectors $t1$ to $t16$ are arranged closely together in a plane which is perpendicular to this direction of radiation. The surface just mentioned is therefore a plane projection surface. The individual detectors $t1$ to $t16$ are arranged spatially displaced relative to each other. In determining the spacing, care must be taken that no corona phenomena occur.

The predetermined number of 16 detectors is divided into two groups, of which each comprises the same number, namely, 8 detectors. If the number of detectors is larger, more groups will be provided. As can be seen from FIG. 1, the detectors $t1$ to $t8$ as well as the detectors $t9$ to $t16$ are always arranged together, distributed in a separate group plane. The distance between these two group planes is indicated by $a$. The two group planes are aligned here parallel to each other. The detectors $t1$ to $t8$ of the upper group plane and the detectors $t9$ to $t16$ of the lower group plane are in each case arranged in a symmetrical configuration. A circle is in each case provided as the symmetrical configuration. This becomes clear through a view onto the projection plane according to FIG. 2. The axes of symmetry of the two circular configurations $k1$ and $k2$ coincide with each other and with the main beam axis $h$ of the transmitter $e$.

Figure 2:
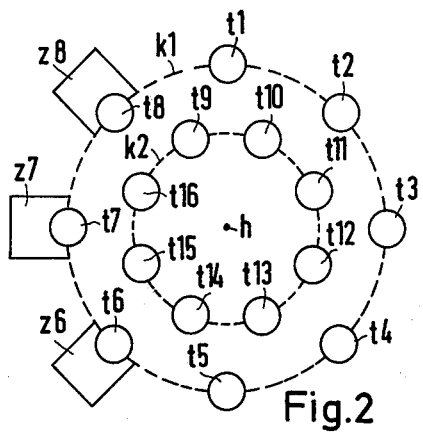
FIG. 2 shows the arrangement of the detectors of FIG. 1 if viewed in the direction of the radiation from the reflector.

It will further be seen from FIGS. 1 and 2 that the lower circular configuration $k2$ is smaller than the upper circular configuration $k1$. In general, it is extremely advantageous if the size of the symmetrical configurations decreases in the direction of the radiation from the transmitter $e$. It is further seen from FIG. 2 that the two circular configurations are rotationally displaced relative to each other by 22.5° about the direction of the main beam axis $h$. One thereby obtains a high utilization of space.

It should be pointed out once more that, in a view in the radiation direction away from the reflector r and in the direction toward the detectors t1 to t16, the size of the two symmetrical circular configurations k1 and k2 decreases. Together, the two circular configurations k1 and k2 form a rotation-symmetrical body, and specifically, a truncated cone, which is tapered in the direction of radiation away from the reflector r. This is indicated by the dashed lines in FIG. 1. The relation of the firing circuits can be arranged here so thay they are directed radially outward relative to the main beam axis h. This is shown in FIG. 2 for the firing circuits z6, z7 and z8. Thereby it is accomplished that these firing circuits z6 to z8, to which should further be added the associated valves and heat sinks, do not cover up the detectors t9 to t16 lying in the lower group plane. In this manner, the projection plane is well utilized.

It should further be pointed out that the arrangement of the individual detectors in the group planes, deviating from FIG. 2, can be made not as a circle, but also in a rectangular, oval or elliptical configuration. In that case, one obtains at the body truncations of rectangular, oval or elliptical pyramids.

In FIG. 1, the generatrix m of the body, which is formed by the two circular configurations k1 and k2, is shown as a straight line. If there are more than two group planes, this generatrix m can preferably have a curved shape. This means that the distance a between the individual group planes is not the same everywhere. By suitably shaping the generatrix m, e.g., by giving it parabolic form, one can achieve that all the detectors t1 to t16 are exposed practically to the same electric field strength. This shaping is a contributing factor that in the case of semiconductor valves which are used in a rectifier for very high voltages, e.g., for 1 MV, corona discharges cannot occur.

It was already mentioned that the individual valves can be connected in series and can be laid out, for instance, for a switching voltage of 1 kV. The valve associated with the detector t1 should have to switch here the lowest potential, i.e., 1 kV to ground. The valve associated with the adjacent detector t2 will have to switch the next-higher potential, i.e., 2 kV against 1 kV, etc., so that the valve associated with the detector t8 must, therefore, switch 8 kV against 7 kV. The electrical transition from the last valve in the first group plane to the first valve in the second group plane is accomplished so that said first valve is the closest, i.e., in the example, the valve associated with the detector t9. The series connection of the following valves proceeds in the direction of the detectors t9 to t16. It is thereby accomplished that no potential difference greater than 8 kV exists between two nearest neighbors from two group planes. Between two neighbors in the same group plane, however, there exists only a potential difference of the magnitude of the switching voltage, i.e., in the order of 1 kV.

Figure 3:
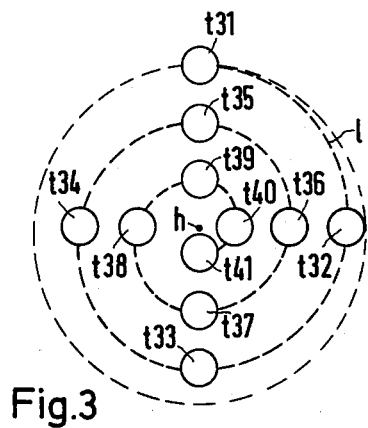
FIG. 3 shows a helical arrangement of detectors, viewed in the direction of the radiation from the reflector.

FIG. 3 shows in a presentation which corresponds to that of FIG. 2, an arrangement of further detectors t31 to t41. In viewing FIG. 3, one looks again in the direction of the radiation from the reflector and in the direction of the side of the main beam axis. The detectors t31 to t41 are arranged along a helical line 1, which is shown by a broken line in FIG. 3. The radius of the helical line is to decrease as it progresses in the direction of the radiation away from the transmitter. This results in the spiral visible in FIG. 3. FIG. 3 makes it clear, furthermore, that a high area-wise density of the detectors t31 to t41 can be achieved in the projection plane (plane of paper in FIG. 3). As seen in the direction of the main beam axis h, the detectors t31 to t41 in FIG. 3 are always arranged rotationally shifted by 90° along the helical line 1.

Figure 4:
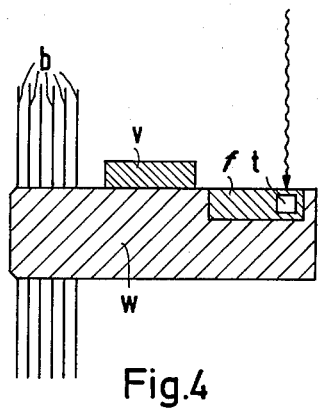
FIG. 4 shows an illustration in cross section of a valve arranged at a heat sink, the firing circuit of which including the detector is accommodated in the heat sink.

In FIG. 4 is shown in cross section an electric valve v, which is connected with good thermal contact to a solid heat sink w made of a material with high heat conductivity. The material to be used can be a metal such as aluminum, copper or brass. In conjunction with the heat sink w, a so-called heat pipe can also be used. The heat sink w is equipped at its outer end with cooling fins b, which take care of removing the dissipation heat developed by the valve v in operation and may be ventilated by blowers. The cooling fins b of several heat sinks w can be arranged in a central cooling channel. The firing circuit f of the valve v is arranged in the heat sink w, as is the detector t which may be, for instance, a photosensitive element or a high-frequency antenna. The electromagnetic radiation incident on the detector t is indicated by a wavy arrow. With heat sinks w of this kind, a high area-wise density of the detectors t can be achieved.

It is considered as an advantage of the arrangement of the detector t and the firing circuit z in the heat sink w, as shown in FIG. 4, that the arrangement represents a compact unit which is largely protected against mechanical damage. Exposed lines, which can lead to corona discharges, can thus be avoided. As a decisive advantage, however, is considered the fact that the necessary components can be worked into the heat sink w. A cavity resonator can thus be milled directly into the solid heat sink w. This brings about on the one hand, material savings and on the other hand, space savings. To this is added further an effective cooling of the high-frequency components.

What is claimed is:

1. In a firing device for a plurality of electric valves comprising a plurality of detectors for electromagnetic radiation each forming an input to a firing circuit coupled to a valve said electric valves being electrically coupled in at least one circuit, all valves being required to be simultaneously fired, the firing device also including a transmitter coupled to means providing thereto a firing control signal, said transmitter being equipped with a radiator which directs energy toward the plurality of detectors for the individual valves, said individual detectors being arranged so as to be able to intercept the radiation from the radiator to permit firing of the valves without a wired connection, the improvement comprising:
   a. the radiating device being designed to generate substantially parallel rays of electromagnetic radiation; and
   b. the plurality of detectors for electromagnetic radiation being arranged spacially displaced relative to each other such that each is exposed to the parallel ray beam from said radiating device without mutual shadowing when all of said detectors are projected onto a plane perpendicular to the direction of radiation as viewed in the direction of radiation.

2. The apparatus according to claim 1 wherein said plurality of detectors is subdivided into at least two groups of detectors and wherein each of said groups of detectors is arranged in a group plane perpendicular to the direction of radiation with said two group planes disposed parallel to each other.

3. The apparatus of claim 2 wherein said detectors are arranged, at least within a group plane, in a symmetrical configuration.

4. The apparatus of claim 3 wherein the detectors in each group plane each are arranged in a symmetrical configuration, and that the symmetry axes of all configurations coincide with each other and with the direction of radiation from the transmitter.

5. The apparatus of claim 4 wherein the symmetrical configurations are rotationally displaced relative to each other.

6. The apparatus of claim 4 wherein the symmetrical configurations are of different sizes.

7. The apparatus of claim 6 wherein the size of the symmetrical configurations decreases in the direction of radiation from the transmitter.

8. The apparatus of claim 4 wherein the symmetrical configuration is a rectangle.

9. The apparatus of claim 4 wherein the symmetrical configuration is a circle.

10. The apparatus of claim 4 wherein the symmetrical configuration is an ellipse.

11. The apparatus of claim 7 wherein the generatrix of the body formed by the configurations is a straight line.

12. The apparatus of claim 7 wherein the generatrix of the body formed by the configuration is parabolic.

13. The apparatus of claim 1 wherein the detectors are arranged along a helical line, the radius of which decreases upon progressing in the direction of the radiation from the transmitter.

14. The apparatus of claim 1 wherein the detectors are of elongated shape and their longitudinal axes are aligned radially with respect to an axis which coincides with the main direction of radiation from the transmitter.

15. The apparatus of claim 1 wherein each valve is equipped with a heat sink on which each associated detector is mounted.

16. The apparatus of claim 1 wherein the electric valves are thyristors.

17. The apparatus of claim 1 wherein said electromagnetic radiation is in the visible range of the frequency spectrum.

18. The apparatus of claim 1 wherein said electromagnetic radiation is in the infrared range of the frequency spectrum.

19. The apparatus of claim 1 wherein said electromagnetic radiation is in the high frequency range of the frequency spectrum.

* * * * *